No. 876,224. PATENTED JAN. 7, 1908.
D. O'NEILL.
CALK GRINDER.
APPLICATION FILED JULY 8, 1907.

2 SHEETS—SHEET 1.

WITNESSES
Samuel E. Wade
C. E. Trainor

INVENTOR
DANIEL O'NEILL
BY Munn & Co.
ATTORNEYS.

No. 876,224. PATENTED JAN. 7, 1908.
D. O'NEILL.
CALK GRINDER.
APPLICATION FILED JULY 8, 1907.

2 SHEETS—SHEET 2.

WITNESSES
Samuel E. Wade
C. E. Trainor

INVENTOR
DANIEL O'NEILL
BY Munn & Co.
ATTORNEYS.

UNITED STATES PATENT OFFICE.

DANIEL O'NEILL, OF LUCINDA, PENNSYLVANIA.

CALK-GRINDER.

No. 876,224.     Specification of Letters Patent.     Patented Jan. 7, 1908.

Application filed July 8, 1907. Serial No. 382,603.

*To all whom it may concern:*

Be it known that I, DANIEL O'NEILL, a citizen of the United States, and a resident of Lucinda, in the county of Clarion and State of Pennsylvania, have invented certain new and useful Improvements in Calk-Grinders, of which the following is a specification.

My invention is an improvement in calk grinders; and consists in certain novel constructions and combinations of parts as will be hereinafter described and claimed.

Figure 1:
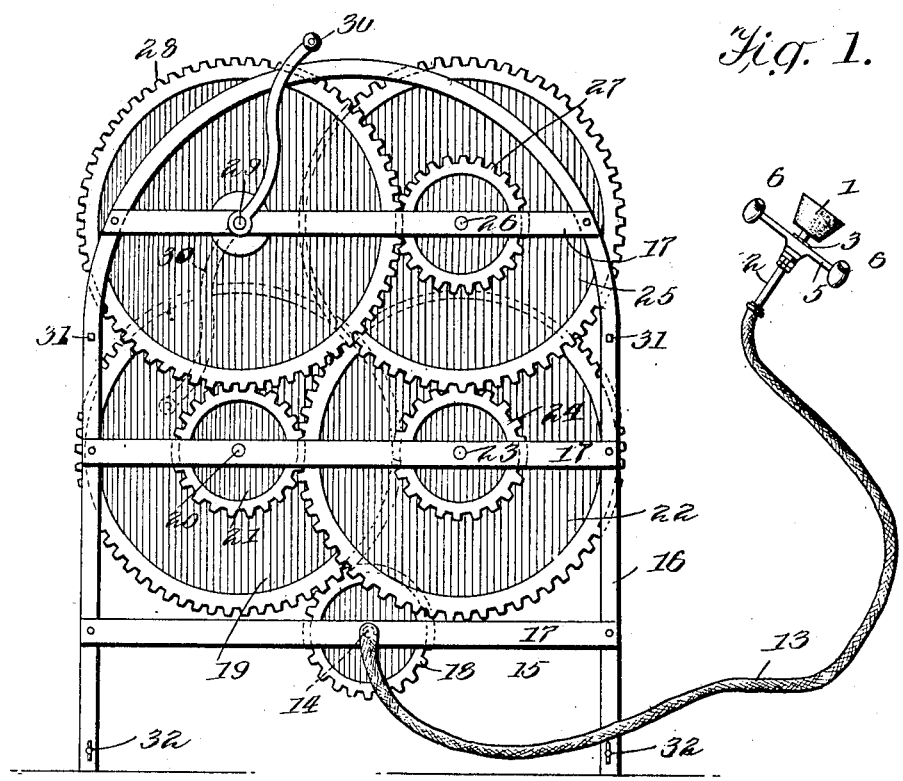
Figure 2:
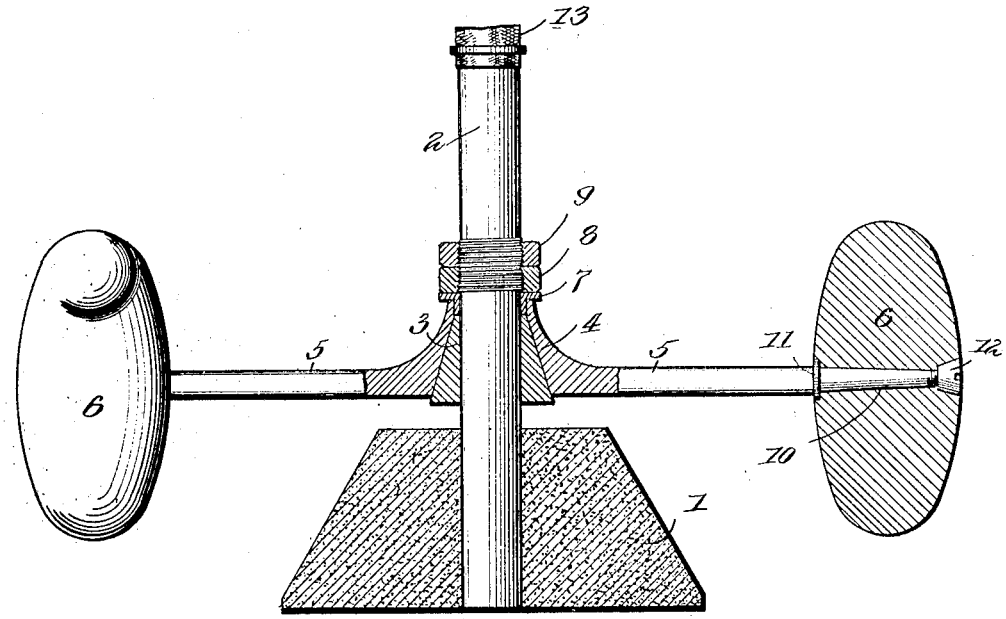

Referring to the drawings forming a part hereof Figure 1 is a side view of the improvement and its operating mechanism. Fig. 2 is a central longitudinal section through the grinder.

The present embodiment of my invention is adapted to be driven by power and consists of an emery wheel 1 of frusto-conical shape secured in any suitable manner to the end of a shaft 2 which is provided adjacent to the emery wheel with a cone shape bearing sleeve 3 adapted to be received in a cone shape bearing 4 in a bar 5, provided on each end with transverse grips 6.

A collar 7 is arranged on the shaft on the opposite side of the grip bar from the emery wheel to retain the bearing surfaces of the sleeve and the bar in proper contact, and the collar is secured in place by a nut 8 which in turn is locked by a locking nut 9.

The grips 6 are of any suitable material and of the shape shown in Fig. 3, and are provided with a transverse conical opening 10 therethrough for receiving the conical end of the grip bar, the said bar being provided with a collar 11 on the inner side of the grip, the said grip being countersunk to receive the collar and a nut 12, which is threaded onto the end of the bar for retaining the grip in place.

The end of the shaft opposite to the emery wheel is intended to be connected with a flexible shaft 13, and the flexible shaft is connected by its other end with a shaft 14 journaled in a frame-work 15 comprising sides composed of U shape members 16, having their arms connected by suitable cross-bars 17. The shaft 14 is provided with a pinion 18, meshing with a gear wheel 19 on a shaft 20 journaled in the cross-bars, and the shaft 20 is provided with a pinion 21 meshing with a gear wheel 22 on a third shaft 23.

The shaft 23 is provided with a pinion 24 meshing with a gear wheel 25 on a shaft 26, which in turn is provided with a pinion 27 meshing with a gear wheel 28, on a driving shaft 29 provided on its outer ends with cranks 30 whereby to operate the said shaft.

The U shape side members of the frame, are connected together at suitable points by bolts 31 and the ends of the arms of each member are provided with setscrews 32 whereby to secure the frame-work to any suitable support.

In the operation of the machine the frame-work is secured to any suitable support and the shaft 2 is connected with the flexible shaft 13.

The grinding device is held by the grips with the emery wheel towards the operator, and so applied to the calks, the beveled or conical surface of the wheel being used to grind the inclined or beveled portion of the toe calks, while the base of the wheel is used to grind the flat side of the toe calks. The heel calks are ground in the same manner, the base of the wheel being used, however, for the inclined face of the said calks.

I claim—

1. The combination with an operating mechanism, of a calk grinder comprising a shaft provided on one end with a frusto-conical emery wheel, a conical bearing sleeve on the shaft, a transverse grip bar provided with a conical bearing for receiving the sleeve, a collar for retaining the parts in position, nuts on the shaft for locking the collar, said grip bar having conical ends, grips having conical openings for receiving the ends, nuts threaded on the ends of the bar for securing the grips in place, and a flexible shaft connecting the emery wheel shaft and the operating mechanism.

2. The combination with an operating mechanism, of a calk grinder comprising a shaft provided on one end with a frusto-conical emery wheel, a conical bearing sleeve on the shaft, a transverse grip bar provided with a conical bearing for receiving the sleeve, means for retaining the bearing surfaces in contact, said grip bar having conical ends, grips having conical openings for receiving the ends, nuts threaded on the ends of the grip bar for securing the grips in place, and a flexible shaft connecting the operating mechanism with the emery wheel shaft.

3. The combination with the operating mechanism, a calk grinder comprising a shaft provided on one end with an emery wheel, a grip bar in which the shaft is journaled, a grip on each end of the bar, said grip bar having conical ends, and the grips having conical openings for receiving the ends, said grip bar having integral washers for limiting the inward movement of the grips and a flexible shaft connecting the operating mechanism with the emery wheel shaft.

DANIEL O'NEILL.

Witnesses:
H. M. HUFNAGEL,
FRANK C. SHIRLEY.